(12) United States Patent
Kia et al.

(10) Patent No.: US 9,406,971 B2
(45) Date of Patent: Aug. 2, 2016

(54) SHAPE MEMORY POLYMER CONTAINING COMPOSITE MATERIALS

(75) Inventors: Hamid G. Kia, Bloomfield Hills, MI (US); Mark W. Verbrugge, Troy, MI (US); Tao Xie, Troy, MI (US); Ingrid A. Rousseau, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 432 days.

(21) Appl. No.: 13/175,396

(22) Filed: Jul. 1, 2011

(65) Prior Publication Data
US 2013/0004857 A1    Jan. 3, 2013

(51) Int. Cl.
| | |
|---|---|
| H01M 10/0525 | (2010.01) |
| B29C 61/06 | (2006.01) |
| C08J 9/00 | (2006.01) |
| C08J 9/35 | (2006.01) |
| H01M 2/16 | (2006.01) |
| H01M 10/42 | (2006.01) |

(52) U.S. Cl.
CPC ....... *H01M 10/0525* (2013.01); *B29C 61/0608* (2013.01); *B29C 61/0658* (2013.01); *C08J 9/0061* (2013.01); *C08J 9/35* (2013.01); *H01M 2/162* (2013.01); *H01M 10/4235* (2013.01); *C08J 2400/12* (2013.01); *Y02E 60/122* (2013.01); *Y10T 29/49108* (2015.01)

(58) Field of Classification Search
CPC ............. H01M 2/162; H01M 10/0525; A61B 2017/00867; A61B 2017/00871; A61L 2400/16; Y10S 428/913
USPC ............ 264/230, 41, 45.1; 428/71, 76, 319.3, 428/319.7, 319.9; 267/64.13, 64.23; 429/242, 126.4, 126.3
See application file for complete search history.

(56) References Cited

U.S. PATENT DOCUMENTS

| | | | | |
|---|---|---|---|---|
| 3,766,106 A | * | 10/1973 | Yurimoto et al. | 523/134 |
| 5,910,357 A | * | 6/1999 | Hachisuka et al. | 428/315.5 |
| 2007/0131610 A1 | * | 6/2007 | Peng et al. | 210/500.27 |
| 2009/0258575 A1 | | 10/2009 | Hreha et al. | |
| 2010/0035141 A1 | * | 2/2010 | Grosvenor | 429/129 |
| 2010/0279173 A1 | * | 11/2010 | Hying et al. | 429/247 |
| 2010/0316845 A1 | | 12/2010 | Rule et al. | |

FOREIGN PATENT DOCUMENTS

| | | |
|---|---|---|
| DE | 60105593 T2 | 2/2005 |
| JP | 04-146931 A | 5/1992 |

OTHER PUBLICATIONS

Chinese Office Action dated Sep. 18, 2014 ; Application No. 201210220280.8 ; Applicant : GM Global Technology Operations LLC ; 3 pages.
Chinese Office Action dated Mar. 27, 2015; Application No. 201210220280.8 ; Applicant: GM Global Technology Operations LLC.; 7 pages.
German Office Action dated Sep. 9, 2015 , Application No. 10 2012 211 304.5 : Applicant: GM Global Technology Operations LLC ; 5 pages.
Chinese Office Action dated Dec. 1, 2015; Application No. 201210220280.8 ; Applicant:GM Global Technology Operations LLC.;13 pages.
Handbook of Chemical Fibers; published by China Textile and Apparel Press on Sep. 30, 2008.

* cited by examiner

*Primary Examiner* — Mark F Huff
*Assistant Examiner* — Monique Wills
(74) *Attorney, Agent, or Firm* — BrooksGroup

(57) ABSTRACT

A product, and a method for forming a product, that includes a composite material having a polymeric carrier resin and a shape memory polymer material capable of transformation between a temporary shape and a permanent shape in the presence of an external stimuli, wherein said transformation from said temporary shape to said permanent shape changes at least one property of said composite material.

26 Claims, 2 Drawing Sheets

SHAPE MEMORY POLYMER CONTAINING COMPOSITE MATERIALS

TECHNICAL FIELD

The technical field generally relates to composite materials and more specifically to shape memory polymer containing composite materials.

BACKGROUND

Shape memory polymers (SMPs) are responsive polymers that can adopt desired deformed temporary shapes upon the simultaneous action of a mechanical deformation and of an external stimulus (i.e., heating above their transition temperature). Furthermore, SMPs can recover their permanent (original) shapes simply upon applying the same or a different external stimulus (e.g., heating above their transition temperature).

SUMMARY OF EXEMPLARY EMBODIMENTS

The exemplary embodiments include a product, and a method for forming a product, that includes a composite material having a polymeric carrier resin and a shape memory polymer material capable of adopting, on-demand, a temporary shape or a permanent shape, wherein said transformation from said temporary shape to a permanent shape changes at least one property of said composite material.

In one more specific exemplary embodiment, the shape memory polymer material is a shape memory fiber that is chopped or otherwise formed to a desired size.

In another more specific exemplary embodiment, the shape memory polymer material is a hollow microsphere.

In still another exemplary embodiment, the product is a foam shape memory polymer material originally formed with the SMP polymer material in its temporary shape that is capable of transformation from a temporary shape to a permanent shape, wherein the transformation leads to a product that may have different material or physical properties.

Other exemplary embodiments will become apparent from the detailed description provided hereinafter. It should be understood that the detailed description and specific examples, while disclosing exemplary embodiments, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

Figure 1:
FIG. 1 is a perspective view for forming shape memory polymer fiber according to one exemplary embodiment.
Figure 2:
FIG. 2 is a perspective view of the shape memory polymer fiber of FIG. 1 heated and stressed to a temporary shape.

The following description of the embodiment(s) is merely exemplary (illustrative) in nature and is in no way intended to limit the invention, its application, or uses.

Shape memory polymers (SMPs) are responsive polymers that can adopt and fix deformed temporary shapes and recover to their permanent (original) shapes under an external stimulus such as heat, moisture, radiation, and the like. Commonly, SMPs exhibit a dual shape memory effect (DSME), wherein the SMP can only be transitioned from one temporary shape to its permanent shape in each shape memory cycle. In contrast, other SMPs can exhibit a triple shape memory effect (TSME) or greater, wherein the SMP can be transitioned from two distinct temporary shapes (for a TSME) or more in addition to its permanent shape in each memory cycle.

In general, to transform an SMP exhibiting DSME from its permanent shape to its temporary shape, wherein the external stimuli is heat, the permanent shape may be heated to a first elevated temperature and then deformed under stress to yield a temporary shape, a shape which may be different in visual appearance from the permanent shape. By definition, the first elevated temperature is a temperature sufficiently high to ensure a phase transition of the SMP that is above the shape memory transformation temperature ($T_{trans}$) that may be such as a glass or a melting transition temperature ($T_g$ or $T_m$) of the SMP. The SMP may then be cooled under stress to a temperature below the shape memory phase transition temperature of interest of the SMP, at which temperature the stress may be relieved while the strain/shape achieved by the temporary shape is maintained providing for the shape fixing abilities of the SMP. To recover the permanent shape from the temporary shape, the SMP may be reheated to above the phase transition temperature in the absence of stress.

The exemplary embodiments form products that take advantage of the SMP's ability to transform between its temporary shape and its permanent shape using heat as an external stimuli by combining it with a polymer carrier resin to form a composite material that is transformable from between a smaller, or compressed shape, and a larger, or noncompressed shape, upon heat activation. This transformation may also impart other changes to the composite material, such as changing the material's thermal conductivity or electrical conductivity, which may be desirable to the end product. Suitable SMP's can be thermoplastics, interpenetrating networks, semi-interpenetrating networks, mixed networks, or thermosets. The polymers can be a single polymer or a blend of polymers. The polymers can be linear or branched thermoplastic elastomers or thermosets with side chains or dendritic structural elements. Suitable polymer components used to form a shape memory polymer include, but are not limited to, polyphosphazenes, poly(vinal alcohols), polyamides, polyester amides, poly(amino acids)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amids, polyether esters, and copolymers thereof.

Exemplary embodiments that may utilize the composite material product are ones in which it is desirable for such a product to impart changes in size or shape and/or changes in some physical property such as thermal or electrical conductivity as a result of the transformation of the SMP. One exemplary product which may utilize the composite material is a polymeric separator sheet for separating the anode (negative electrode) and the cathode (positive electrode) in a lithium-ion battery system, wherein the transformation of the SMP may act to increase the useable life of the lithium-ion battery system and/or prevent unsafe catastrophic failure conditions.

Figure 6:
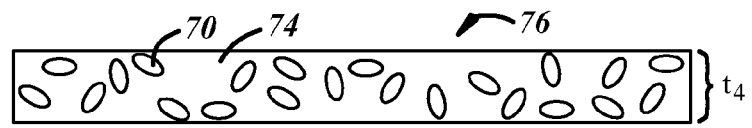
FIG. 6 is a perspective view of a formed and compressed product including the shape memory polymer microsphere of FIG. 5B in its temporary shape.
Figure 7:
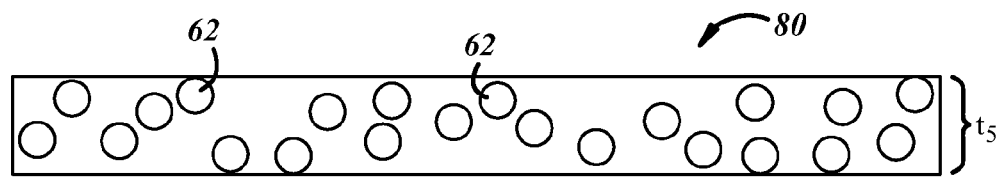
FIG. 7 is a perspective view of a product of FIG. 6 wherein the shape memory polymer microsphere of FIG. 5B has transformed to its permanent shape as in FIG. 5A.
Figure 8:
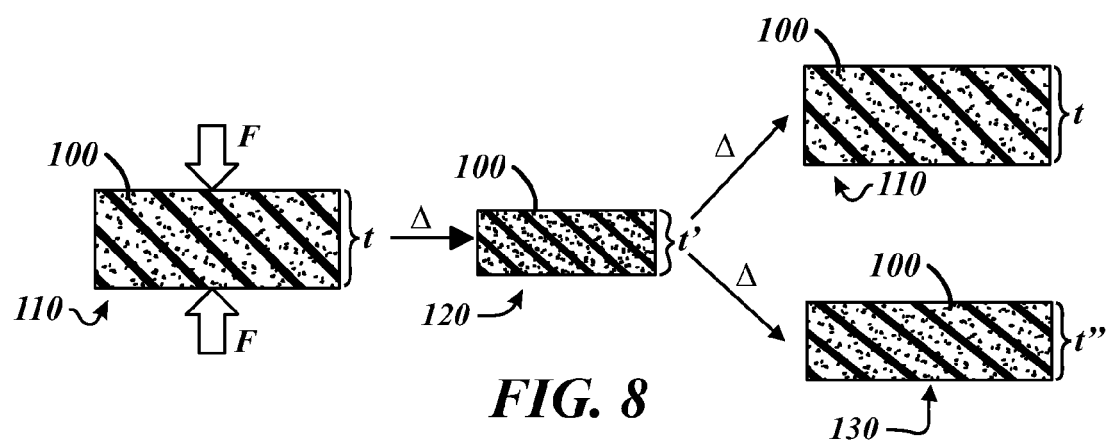
FIG. 8 is a perspective view of a method for forming a product by transforming a foamed shape memory polymer material from its temporary shape to its permanent shape.

In one exemplary embodiment of a product of the present invention, as shown in FIGS. 1-4, the SMP is in the form of a fiber. In another exemplary embodiment, as shown in FIG. 5-7, the SMP is in the form of a microsphere. In another exemplary embodiment, as shown in FIG. 8 below, the SMP material does not utilize a polymeric carrier resin, but instead forms a SMP foam wherein changes to the SMP foam itself may produce characteristics that may be desirable to the end product.

Each is described further below as having SMP materials that are transformed by heat, although other exemplary embodiments may include SMP materials that are transformed by other types of external stimuli.

Referring first to FIG. 1, in one exemplary embodiment, a thermoplastic material 20 may be extruded or otherwise formed into a long strand and wrapped around a mandrel 22. The thermoplastic material 20 may then be physically crosslinked or partially covalently crosslinked to form an SMP fiber material 24. In one exemplary embodiment, the covalent crosslinking may be accomplished via radiation, whereas physical crosslinking is may be induced through crystallization of the thermoplastic resin itself or other molecular interactions such as ionic interactions/complexation, hydrogen bonding, or the like. The physically or covalently crosslinked SMP fiber material 24 may be removed from the mandrel 22, wherein it is maintained in its permanent shape 25. While the permanent shape 25 will mainly be dictated by the shape of the mandrel 22, the thickness and composition of the SMP fiber material 24, the curing conditions, and/or other environmental and processing factors may also influence the permanent shape 25 of the SMP fiber material 24. The permanent shape 25 may be maintained at temperatures below the phase transition temperature of the fiber material 24 (i.e. is a temperature below the shape memory transformation temperature ($T_{trans}$) of the fiber material 24).

Of course, the SMP fiber material 24 may be formed into strands and partially cured by other methods, and is thus not limited to the method described in FIG. 1.

Next, the SMP fiber material 24, in its permanent shape 25, may be heated to a first elevated temperature sufficiently high to ensure a phase transition of the polymeric component of the SMP fiber material 24 (i.e. to a temperature above the $T_{trans}$ of the SMP polymeric component of the SMP fiber material 24). At this elevated temperature, the fiber material 24 may be stressed (here stretched) to a new, temporary shape 26, shown in FIG. 2 as a straight linear shape 26. The straight linear shape 26, as one of ordinary skill recognizes, occupies less volume than the permanent shape 25, which is slightly coiled or lofted. The fiber material 24 may then be cooled below the phase transition temperature, and the stress removed, wherein the fiber material 24 may be maintained in its temporary shape 26.

Figure 3:
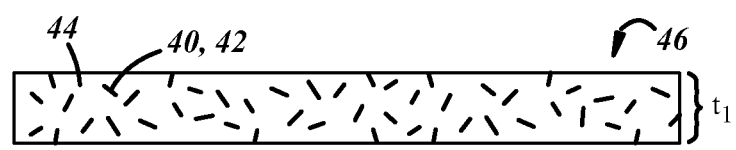
FIG. 3 is a perspective view of a product in a temporary compressed shape including the shape memory polymer fiber of FIG. 2 according to one exemplary embodiment.

Next, as shown in FIG. 3, fiber material 24 in the straight temporary shape 26 may be chopped into small SMP fiber pieces 40 and admixed with a polymeric carrier resin 44 and cast or otherwise formed into a thin sheet 46 having a thickness $t_1$. The polymeric carrier resin 44, as will be described further below, may be in the form of a single polymeric material or a blend of polymeric materials, and may also include other components such as fillers, solvents, catalysts, processing aids, ultraviolet light protectors, dyes and the like. In addition, the polymeric carrier resin 44 may include other polymeric and non-polymeric reinforcing agents in the form of fibers, platelets, particles, or the like such as glass, metal, or the like, that provide improved durability and stiffness to the resultant product. Preferably, the polymeric carrier resin 44 is compatible with the chopped SMP fiber pieces 40 such that they are easily dispersed and maintained within the polymeric carrier resin 44.

The composition of the polymeric carrier resin 44 and the chopped SMP fibers 40 of the exemplary embodiments of FIG. 1-4 may be dictated by the desired mechanical and/or physical properties of a product to which it may be utilized and may also be limited by the operating system in which it may be utilized.

One exemplary composition will be described below for one exemplary use, namely a separator sheet for a lithium-ion battery system.

Figure 4:
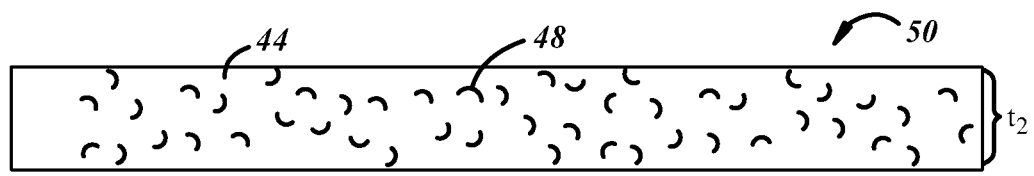
FIG. 4 is a perspective view of the product of FIG. 3 after transformation of the shape memory polymer fiber from its temporary shape to its permanent shape.

Next, as shown in FIG. 4, the thin sheet 46 may then be heated to temperatures above the shape memory transformation temperature ($T_{trans}$) for the chopped SMP fiber pieces 40 in the absence of stress. At this temperature, the chopped SMP fibers pieces 40 may revert back to their original permanent shape 48, here shown as slightly coiled (or lofted). The carrier resin surrounding the coiled SMP fiber pieces is forced to rearrange (i.e, molecular rearrangement, microcracks, etc.), thereby causing an apparent volume change of the thin sheet 46 to expand to form a new thicker sheet 50 having a thickness $t_2$ corresponding to the increased apparent volume, wherein thickness $t_2$ is greater than thickness $t_1$.

The thicker sheet 50 may have different mechanical properties and/or physical properties than the thin sheet 46. For example, the thicker sheet 50 may have increased, or decreased, thermal conductivity characteristics, as compared to the thin sheet 46. Moreover, the thicker sheet 50 may also have increased, or decreased, electrical conductivity characteristics, as compared to the thin sheet 46. Further, the thicker sheet 50 may be more porous, or less porous, than the thin sheet 46. In addition, the thicker sheet 50 may be tougher, or more durable than the thin sheet 46. By knowing how the expansion affects the sheets in one or more desired characteristics, one can tailor the thin sheets 46 to produce thicker sheets 50 having a desired set of performance characteristics.

Depending upon its ultimate use, the thin sheet 46, or the thicker sheet 50, may be introduced to or form an end-use product. One such end-use exemplary use in a product may be a separator sheet for a lithium-ion battery system, which will be described further below.

In an alternative embodiment, as shown in FIG. 5-7, a shape memory polymer (SMP) microsphere 60 may be used in place of the chopped SMP fiber pieces 40 to achieve the desired result.

Figure 5A:
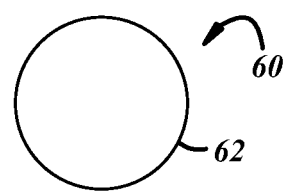
FIGS. 5A and 5B are perspective views of a shape memory polymer microsphere in its permanent and temporary shape according to an exemplary embodiment.

As shown first in FIG. 5A, the SMP microsphere 60 may be formed in a permanent shape 62, here shown as a circular permanent shape, as having a cavity portion surrounded by a SMP polymeric shell of a predetermined desired thickness.

Figure 5B:

Next, as shown in FIG. 5B, the microsphere 60 may be transformed from its original permanent shape 62 to a temporary shape 70. This may be accomplished by heating the microsphere 60 to a first elevated temperature sufficiently high to ensure a phase transition of the SMP component of the microsphere (i.e. is a temperature above the shape memory transformation temperature ($T_{trans}$) of the SMP polymeric component of the trans, a microsphere 60). At this elevated temperature, the microsphere 60 may be stressed (here compressed) to a new, temporary shape, shown in FIG. 5B as an oval shape. The oval, temporary shape 70 of FIG. 5B, as one of ordinary skill appreciates, assumes a different morphology than the circular, permanent shape 62 of FIG. 5A. The microsphere 60 may then be cooled below the phase transition temperature, and the stress removed, wherein the microsphere may be maintained in its temporary shape 70.

Next, as shown in FIG. 6, the microspheres 60 in their temporary shape 70 may be admixed with a polymeric carrier resin 74 and cast into a thin sheet 76 having a thickness $t_4$.

Finally, as shown in FIG. 7, the thin sheet 76 may then be heated to temperatures above the phase transition temperature for the microsphere 60 in the absence of stress. At this temperature, the temporary shape 70 of the microspheres may revert back to its original permanent shape 62 having varying dimensions. The difference in dimensions of the microspheres 60 in their permanent shape 62 compared to those of the microspheres 60 in their temporary shape 70 may in turn cause the thin sheet 76 to expand to a new thicker sheet 80 having a thickness $t_5$, wherein thickness $t_5$ is greater than thickness $t_4$.

In one embodiment, the microspheres 60 may be aligned within the polymeric carrier resin 74 in a preferential direction during processing of the thin sheet 76 so that upon activation the microspheres 60 assume a preferred morphology which may favor a particular direction.

Similar to the thicker sheet 50 of FIGS. 1-4, the thicker sheet 80 may have different mechanical properties and/or physical properties than the thin sheet 76. For example, the thicker sheet 80 may have increased, or decreased, thermal conductivity characteristics, as compared to the thin sheet 76. Moreover, the thicker sheet 80 may also have increased, or decreased, electrical conductivity characteristics, as compared to the thin sheet 76. Further, the thicker sheet 80 may be more porous, or less porous, than the thin sheet 76. In addition, the thicker sheet 80 may be tougher, or more durable than the thin sheet 76. By knowing how the expansion affects the sheets in one or more desired characteristics, one can tailor the thin sheets 76 to produce thicker sheets 80 having a desired set of performance characteristics.

The microsphere 60 may be formed from one or more polymeric materials having shape memory properties such as crosslinked polyethylene and polypropylene similar to the chopped SMP fiber pieces 40 as described above. The microsphere 60 may also be formed as an epoxy microsphere inside a polyolefin-based matrix, wherein the microsphere may be formed by phase separation. The microsphere 60 may also be formed from inorganic materials having shape memory properties such as glass, ceramics metals and metal alloys in certain applications. In any of the exemplary embodiments, it is preferred that the microsphere is compatible with the polymeric carrier resin 74. Such compatibility may be inherent to the materials being used or maybe enabled by additives such as surfactants, compatibilizers, chemical functionalization of the SMP filler surface, etc.

The exemplary embodiments as described in FIG. 1-7 above represent two possible SMP polymeric shapes. However, as one of ordinary skill appreciates, the exemplary embodiments may find use with SMP materials of other permanent and temporary shapes, wherein the temporary shape and permanent shape occupy a different volume and/or different dimensions in their respective shapes.

In another exemplary embodiment, an SMP material may be formed as a thermoplastic sheet in a compressed state without the use of a polymeric carrier resin. In other words, the SMP material may be considered the carrier resin itself and thus be placed in a temporary, thin sheet and stimulated by external means to form a thicker, permanent sheet. One exemplary material that may be used in this manner may be a shape memory polymer foam that itself may be transformed between a temporary shape and a permanent shape having different physical and/or mechanical characteristics.

In this example, as shown in FIG. 8, the SMP material may first be admixed with other components such as such as fillers, solvents, catalysts, processing aids, ultraviolet light protectors, dyes and the like. Next, the SMP material may be formed, preferably through use of a blowing agent or an external crosslinking agent or the like, into a foam sheet 100 in its permanent shape 110. The foam sheet 100 in its permanent shape 110 may then be heated to a temperature above the phase transition temperature of the SMP polymeric material and stressed (compressed or biaxially stretched) with a Force F to transform the SMP foam sheet 100 into its temporary shape 120, which may be a thinner sheet than the permanent shape 110. The foam sheet 100 may then be introduced to a product as desired. Upon subsequent heat activation at a temperature sufficiently high to ensure a phase transition of the SMP polymer component, in the absence of stress, the foam sheet 100, in its temporary shape 120, may be reverted back to its original, permanent shape 110 or to an intermediate shape 130 of thickness (t") between that of the permanent shape 110 (t) and that of the temporary shape 120 (t') of the SMP foam sheet 100 in the case where external constraints may prevent full recovery of the thickness of the SMP foam sheet in its permanent shape 110.

As with the thicker sheets 50 and 80, the permanent shape 110 or intermediate shape 130 may possess different mechanical properties and/or physical properties than the temporary shape 120. Exemplary foaming materials include polyolefins having shape memory properties such as crosslinked polyethylene and polypropylene.

The exemplary embodiments utilizing the SMP fibers 40, SMP microspheres 60, or SMP foam sheets 100 may be utilized in any number of different applications.

One specific exemplary application utilizing a polymeric carrier resin system 44 and chopped SMP fiber pieces 40 to form a thin sheet 46 may be a separator sheet for a lithium-ion battery system. The thin sheet 46 may be placed in the inner chamber of the lithium-ion battery system and therein may function to prevent physical contact of the positive and negative electrodes while serving as an electrolyte reservoir to enable free ionic transport.

In the event of an increase in temperature in one portion of the lithium-ion battery, for example if there is a short circuit, the heat generated may cause the chopped SMP fiber pieces 40 to be transformed from their temporary shape 42 to their more lofted permanent shape 48, similar to what is described above with respect to FIG. 4, to form a thicker separator sheet 50. Such transformation may provide for an increased resistance to the pressure exerted onto the SMP sheet by the cathode and anode electrodes of the lithium-ion battery during the initiation of a short circuit event. In addition, the thicker sheet 50 may provide additional thermal insulation properties between the negative electrode and the positive electrode to protect the components in the chamber not experiencing the heat increase. Thus, the increased thickness of the thicker sheet 50 may therein prolong the life of the lithium-ion battery system, or at least allow the salvaging of components of the lithium-ion battery system not damaged by the heat increase.

In one exemplary separator system, the composition of the carrier resin 44 may be such that it has a high modulus (equal to or greater than 1 GPa) at the operating temperatures of the battery system, which typically ranges between about 60 and 80 degrees Celsius, while the composition of the chopped SMP fiber pieces 40 may be such that the shape memory transformation temperature of the SMP fiber pieces 40 may also be above the operating temperature of the battery system and has a thermal transition temperature that is sufficiently higher than the processing temperature of the polymeric carrier resin 44. The processing temperature is a temperature at which the polymeric carrier resin 44 may flow due to its thermoplastic nature. The processing temperature may, in some cases, be higher than the melting temperature of the polymeric carrier resin 44. In one example, a sufficiently higher thermal transition temperature for the SMP fibers 40 may be about 20 degrees Celsius higher than the processing temperature of the polymer carrier resin 44.

In one specific exemplary separator sheet, the polymeric carrier resin 44 may be polyethylene, with a processing temperature of about 130 degrees Celsius, while the chopped SMP fiber pieces 40 may be another polyolefin, and more preferably crosslinked polypropylene fibers, and even more preferably high molecular weight polypropylene fibers having a phase transition temperature of about 160 degrees Celsius, which are relatively easy to extrude from pellets to a desired diameter and may be partially covalently crosslinked, via radiation, such as electron beam radiation, and chopped to a desired length.

In another specific exemplary separator sheet, the polymeric carrier resin 44 may be polypropylene, and combined with the polyolefin chopped SMP fibers 40 as also described in the previous paragraph.

In yet another specific exemplary separator sheet, the polymeric carrier resin 44 may be a blend of polyethylene and polypropylene or other appropriate polyolefin resins that may be combined with the polyolefin chopped SMP fibers 44.

In addition, in any of above more specific exemplary separator sheets, the polymeric carrier resin 44 may also include other components such as fillers, solvents, catalysts, processing aids, ultraviolet light, dyes and the like, as well as other polymeric and non-polymeric reinforcing agents such as glass, metal or the like that provide improved durability and stiffness.

In another specific exemplary separator sheet, non-polyolefin polymeric fibers may be utilized that acquire SMP characteristics. Non-limiting exemplary materials may include polyimide fibers or strong polyester fibers including, for example, Kevlar®-type fibers.

In an exemplary subset of separator sheets, microspheres 60 of similar composition to any of the SMP fiber pieces 40 described in the previous exemplary embodiments may be used in place of, or in conjunction with, the SMP fiber pieces 40. In this subset, the composition of the polymeric carrier resin 44 may also be the same composition as described above.

The above description of embodiments of the invention is merely exemplary in nature and, thus, variations thereof are not to be regarded as a departure from the spirit and scope of the invention.

What is claimed is:

1. A product comprising:
   a composite material comprising a carrier polymer material and a shape memory polymer hollow microsphere material configured to transform between a temporary shape and a permanent shape in the presence of an external stimuli, wherein said transformation from said temporary shape to a permanent shape changes at least one property of said composite material wherein the shape memory polymer hollow microsphere material comprises at least one of polyphosphazenes, poly(vinal alcohols), polyamides, polyester amides, poly(amino acids)s, polyanhydrides, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyether amids, polyether esters, and copolymers thereof.

2. The product of claim 1, wherein said external stimuli provides for a temperature differential sufficient to ensure a phase transition of said shape memory polymer to transform said shape memory polymer from said temporary shape to said permanent shape.

3. The product of claim 1, wherein said at least one property comprises an increased thickness of said composite material.

4. The product of claim 3, wherein said increased thickness alters the thermal conductivity of said composite material.

5. The product of claim 3, wherein said increased thickness alters the electrical conductivity of said composite material.

6. The product as set forth in claim 1 wherein the shape memory polymer hollow microsphere material does not include a shape metal alloy.

7. The product of claim 1, wherein said shape memory polymer microsphere material comprises crosslinked polyethylene or crosslinked polypropylene.

8. A product comprising:
   a foam thermoplastic material comprising a carrier polymer material and a shape memory polymer hollow microsphere material at least partially encapsulated by the carrier polymer material and are configured to transform between a temporary shape and a permanent shape in the presence of an external stimuli, wherein said transformation from said temporary shape to a permanent shape changes at least one property of said foamed thermoplastic material, wherein the shape memory polymer hollow microsphere material comprises at least one of polyphosphazenes, poly(vinal alcohols), polyamides, polyester amides, poly(amino acids)s, polyanhydrides, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyether amids, polyether esters, and copolymers thereof.

9. A product comprising:
   a composite material comprising a carrier polymer material and a shape memory polymer material configured to transform between a temporary shape and a permanent shape in the presence of an external stimuli, wherein said transformation from said temporary shape to a permanent shape changes at least one property of said composite material; wherein the shape memory polymer material comprises a plurality of chopped fibers; and said fibers are admixed with the carrier polymer material wherein the fibers comprise crosslinked polypropylene wherein the shape memory polymer chopped fiber material comprises at least one of polyphosphazenes, poly(vinal alcohols), polyamides, polyester amides, poly(amino acids)s, polyanhydrides, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyether amids, polyether esters, and copolymers thereof.

10. The product as set forth in claim 8 wherein the shape memory polymer material comprises polyolefin.

11. The product as set forth in claim 8 wherein the shape memory polymer comprises crosslinked polyethylene or crosslinked polypropylene.

12. The product as set forth in claim 9, where the fibers have a coiled permanent shape and a straight line temporary shape.

13. The product as set forth in claim 1 wherein the shape memory polymer hollow microsphere material comprises at least one of polyphosphazenes, poly(vinal alcohols), poly (amino acids)s, polyanhydrides, polyacrylates, polyalkylenes, polyalkylene glycols, polyalkylene oxides, polyalkylene terephthalates, polyvinyl ethers, polyvinyl halides, polylactides, polyglycolides, polysiloxanes, polyether amids, and copolymers thereof.

14. The product as set forth in claim 9 wherein the shape memory polymer hollow microsphere material comprises at least one of polyphosphazenes, poly(vinal alcohols), poly (amino acids)s, polyanhydrides, polyacrylates, polyalkylenes, polyalkylene glycols, polyalkylene oxides, polyalkylene terephthalates, polyvinyl ethers, polyvinyl halides, polylactides, polyglycolides, polysiloxanes, polyether amids, and copolymers thereof.

15. The product as set forth in claim 1 wherein the shape memory hollow microsphere material does not include polycarbonate, polyolefin, polyester, polyamide, or polypropylene.

16. The product as set forth in claim 9 wherein the shape memory chopped fiber material does not include polycarbonate, polyolefin, polyester, polyamide, or polypropylene.

17. The product as set forth in claim 1 wherein the composite material further comprises a foam thermoplastic material comprising the carrier polymer material.

18. The product as set forth in claim 9 wherein the composite material further comprises a foam thermoplastic material comprising the carrier polymer material.

19. The product of claim 9, wherein the fibers each have a helical shape in the temporary shape or the permanent shape.

20. The product as set forth in claim 9 wherein the shape memory polymer hollow microsphere material does not include a shape metal alloy.

21. The product as set forth in claim 1 wherein the shape memory polymer hollow microsphere material comprises at least one of polyphosphazenes, poly(vinal alcohols), poly (amino acids)s, polyanhydrides, polyacrylates, polyalkylenes, polyacrylamides, polyalkylene glycols, polyalkylene oxides, polyalkylene terephthalates, polyortho esters,-polyvinyl ethers, polyvinyl esters, polyvinyl halides, polylactides, polyglycolides, polysiloxanes, polyether amids, polyether esters, and copolymers thereof.

22. The product as set forth in claim 9 wherein the shape memory polymer hollow microsphere material comprises at least one of polyphosphazenes, poly(vinal alcohols), poly (amino acids)s, polyanhydrides, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polylactides, polyglycolides, polysiloxanes, polyether amids, polyether esters, and copolymers thereof.

23. The product as set forth in claim 9 wherein the shape memory chopped fiber material further comprises a polymeric carrier resin.

24. The product as set forth in claim 23 wherein polymeric carrier resin comprises polymeric and non-polymeric reinforcing agents in the form of fibers, platelets, particles.

25. The product of claim 23 wherein the polymeric carrier resin has a high modulus equal to or greater than 1 GPa within a normal operating range of a lithium-ion battery system.

26. The product as set forth in claim 23 wherein polymeric carrier resin comprises a blend of polyethylene and polypropylene resins.

* * * * *